Patented Dec. 1, 1942

2,303,963

UNITED STATES PATENT OFFICE 2,303,963

METHOD OF MAKING LUMINESCENT MATERIAL

Otto Uhle, Rochester, N. Y., assignor to Eastman Kodak Company, Rochester, N. Y., a corporation of New Jersey No Drawing. Application April 1, 1942, Serial No. 437,209

6 Claims. (Cl. 250—81)

This invention relates to an improved method of making barium fluorochloride in a form which is highly luminescent when subjected to X-rays. The product of this method has a particularly high luminescence, higher than that from barium fluorochloride or a compound predominantly barium fluorochloride produced by other methods.

The following ingredients in fine crystals are mixed, either wet or dry:

| | Parts by weight |
|---|---|
| Barium chloride ($BaCl_2.2H_2O$) | 40 |
| Barium fluoride | 20 |
| Potassium chloride | 9 |

If mixed wet, the mixture should, before firing, be dried in an oven. The dry mixture is then fired at 1500° F. For a batch weighing twenty pounds, three hours is the most satisfactory length of time. A larger batch would, of course, require a longer time. With higher temperatures, the time necessary to produce the same luminescent properties would be decreased, but the crystals would be larger, which would ordinarily be undesirable. After the maximum effect has been attained, further heating is apparently without result. While times and temperatures are not critical, rather close control is desirable. Fair results are obtainable with a temperature of 1300° F. and goods results at 1400° F., but the period of heating must then be of the order of five hours. Good results are also obtainable at a temperature of 1700° F., but the time may then be shortened to two hours. With a very small batch, the time may be much shortened, even to less than an hour, and a useful product obtained. After firing, the material is quenched in water, soluble substances washed out by decantation, and the material dried in an oven.

The preparation made by the preferred formula given approaches rather closely the composition $BaCl_2.BaF_2$ or $BaFCl$, as found by analysis, either of which is included in the term barium fluorochloride.

By varying the proportions of the barium fluoride and barium chloride, there are formed intermediate compounds between the fluoride and chloride, comprising presumably a mixture of the fluorochloride and that halide which is in excess. While these have useful luminescence under X-rays, the maximum intensity is obtained when the proportions approach those given above, namely giving the molar composition $BaFCl$.

The resulting compound gives a violet visible luminescence and is especially fluorescent and phosphorescent in the ultra violet region, that is below 4200 Ängstrom units.

I consider as within my invention such modifications and equivalents as fall within the scope of the appended claims.

I claim:

1. The method of preparing barium fluorochloride in a state such that it is highly luminescent when activated by X-rays that comprises mixing barium chloride and barium fluoride in the presence of a soluble flux and heating the mixture at a temperature of the order of 1500° F. for a period of time of the order of three hours.

2. The method of preparing barium fluorochloride in a state such that it is highly luminescent when activated by X-rays that comprises mixing two parts by weight of barium chloride with one part of barium fluoride in the presence of a soluble flux and heating the mixture at a temperature of the order of 1500° F. for a period of time of the order of three hours.

3. The method of preparing barium fluorochloride in a state such that it is highly luminescent when activated by X-rays that comprises mixing barium chloride and barium fluoride in the presence of a soluble flux and heating the mixture at a temperature between 1300° F. and 1800° F. for a period of time greater than one hour.

4. The method of preparing barium fluorochloride in a state such that it is highly luminescent when activated by X-rays that comprises mixing barium chloride and barium fluoride in the presence of a soluble flux and heating the mixture at a temperature between 1400° F. and 1700° F. for at least two hours.

5. The method of preparing barium fluorochloride in a state such that it is highly luminescent when activated by X-rays that comprises mixing two parts by weight of barium chloride with one part of barium fluoride in the presence of a soluble flux and heating the mixture at a temperature between 1400° F. and 1700° F. for at least two hours.

6. The method of preparing barium fluorochloride in a state such that it is highly luminescent when activated by X-rays that comprises mixing barium chloride and barium fluoride in the presence of a soluble flux and heating the mixture at a temperature of the order of 1500° F.

OTTO UHLE.